US012383451B2

(12) United States Patent
Abdul-Samad

(10) Patent No.: US 12,383,451 B2
(45) Date of Patent: Aug. 12, 2025

(54) METHOD AND APPARATUS FOR ISLAMIC BURIAL

(71) Applicant: Talib Abdul-Samad, New Carrollton, MD (US)

(72) Inventor: Talib Abdul-Samad, New Carrollton, MD (US)

( * ) Notice: Subject to any disclaimer, the term of this patent is extended or adjusted under 35 U.S.C. 154(b) by 0 days.

(21) Appl. No.: 18/770,475

(22) Filed: Jul. 11, 2024

(65) Prior Publication Data

US 2025/0017803 A1 Jan. 16, 2025

Related U.S. Application Data

(60) Provisional application No. 63/512,948, filed on Jul. 11, 2023.

(51) Int. Cl.

| | |
|---|---|
| ***A61G 19/00*** | (2006.01) |
| ***A61G 17/00*** | (2006.01) |
| ***A61G 17/04*** | (2006.01) |

(52) U.S. Cl.

CPC ............. *A61G 19/00* (2013.01); *A61G 17/00* (2013.01); *A61G 17/044* (2016.11)

(58) Field of Classification Search

CPC ...... A61G 17/00; A61G 17/04; A61G 17/044; A61G 17/041; A61G 19/00; A61G 17/024

See application file for complete search history.

(56) References Cited

U.S. PATENT DOCUMENTS

| | | | | |
|---|---|---|---|---|
| 296,362 A * | 4/1884 | Streever | A61G 19/00 27/33 |
| 305,736 A | 9/1884 | Burns | |
| 319,642 A * | 6/1885 | Thayer | A61G 19/00 27/33 |
| 360,239 A * | 3/1887 | Newlove | A61G 19/00 27/33 |

(Continued)

FOREIGN PATENT DOCUMENTS

DE 202011107329 U1 * 2/2012 ............. A61G 17/00

OTHER PUBLICATIONS

Airmeal—Lexington glass gold full couch, Triangle Atlantic Casket Company; https://www.triangleatlantic.com/product/lexington-glass-full-couch/ (Retrieved from internet Oct. 7, 2024); 2 pages.

*Primary Examiner* — William L Miller

(74) *Attorney, Agent, or Firm* — GIBRALTAR CONSULTING LLC; Tariq S. Najee-Ullah

(57) ABSTRACT

Disclosed herein is an Islamic burial lahd that may include a first side wall, a second side wall, a third side wall, a fourth side wall, and a fifth wall forming a chamber. An Islamic burial lahd may include the chamber having an inner wall surface. The chamber is configured to receive a body of a deceased individual oriented in a supine position. An Islamic burial lahd may include a retaining structure having a track connected to the inner wall surface of the chamber. An Islamic burial lahd may include a removable plate having an outer perimeter edge received by a track of the at least one of the one or more retaining structures. The removable plate (Continued)

is configured to retain the body of a deceased individual when the Islamic burial lahd is rotated to position the body from the supine position to a right lateral recumbent position.

19 Claims, 10 Drawing Sheets

(56) References Cited

U.S. PATENT DOCUMENTS

| | | | | |
|---|---|---|---|---|
| 363,530 | A * | 5/1887 | Meredith | A61G 19/00 27/33 |
| 586,071 | A | 7/1897 | Loomis | |
| 626,432 | A * | 6/1899 | Herwig | A61G 17/041 16/424 |
| 680,528 | A * | 8/1901 | Kircher | A61G 19/00 27/33 |
| 1,054,072 | A * | 2/1913 | Yancey | A61G 17/04 52/129 |
| 1,806,990 | A * | 5/1931 | Beiler | A61G 17/044 27/13 |
| 4,407,053 | A | 10/1983 | Ball | |
| 5,673,443 | A | 10/1997 | Marmor | |
| 7,200,906 | B2 | 4/2007 | Darst et al. | |
| 9,198,818 | B2 * | 12/2015 | Tompkins | A61G 17/024 |
| 2005/0108864 | A1 * | 5/2005 | Dennis | A61G 17/04 27/14 |
| 2005/0210642 | A1 * | 9/2005 | Darst | A01N 1/00 27/29 |
| 2015/0067997 | A1 * | 3/2015 | Biller | H04L 63/1441 27/13 |

* cited by examiner

METHOD AND APPARATUS FOR ISLAMIC BURIAL

FIELD OF INVENTION

Embodiments disclosed herein relate to a method and apparatus for burial devices and coffins.

BACKGROUND OF THE INVENTION

Observant Muslims require an Islamic burial. To facilitate a proper Islamic burial, the burial process includes the deceased to be washed, wrapped in burial cloth such as a kifaan (Islamic burial shroud), and to be positioned on the right side facing the Qiblah (direction of prayer for Muslims). It is currently known for a Sunnah to be a commendable act to make a lahd (Islamic burial niche). A lahd is a niche or crevice on the side of a grave positioned in the direction faced for prayer. Many lahads are a rectangular crevice located on the side of a grave. The body of a deceased individual is manually oriented within the grave, by many individuals within the grave, to face the Qiblah or Ka'bah which is the direction faced during prayer. It is common for the body of a deceased individual to be removed from a coffin and physically placed in a grooved niche either in the ground or within the right side wall of a grave. This current process requires a plurality of individuals to be located at the exterior of the perimeter of the grave to lift and lower the body of the deceased individual into the grave. Further, this process also requires a plurality of individuals to be located within the grave to receive and position the body of the deceased individual on its right side. This process is a burden, is costly, and is time intensive. Thus, it would be more desirable to orient the body of a deceased individual, on its right side, during the burial process without need for a plurality of users and to eliminate the need for at least some of the plurality of users to be required to enter the grave during the positioning process.

Further, an Islamic burial requires placing the body of the deceased individual in the ground within three days of death. This short time frame often causes problems because the conventional burial strategy does not always allow for this as there are detailed services including mortuary services, cemetery plots, and additional burial related services which complicate the process. Additionally, the mechanics of appropriately positioning the deceased in the grave may be further complicated by legal requirements for a concrete liner, concrete cover, border installation, grave opening and/or closing. Thus, there is a need to eliminate the need for conventional coffins and liners to expedite the burial process while reducing costs and steps in the process.

Accordingly, there remains a need for an improved method and apparatus for Islamic burial. This need and other needs are satisfied by the various aspects of the present disclosure.

SUMMARY OF THE INVENTION

In accordance with the principles of the present invention, methods and apparatus for an Islamic burial lahd that may include a first side wall, a second side wall, a third side wall, a fourth side wall, and a fifth wall forming a chamber. The Islamic burial lahd may include the chamber having an inner wall surface. The chamber is configured to receive a body of a deceased individual oriented in a supine position. The Islamic burial lahd may include a retaining structure having a track connected to the inner wall surface of the chamber. The Islamic burial lahd may include a removable plate having an outer perimeter edge received by a track of the at least one of the one or more retaining structures. The removable plate is configured to retain the body of a deceased individual when the Islamic burial lahd is rotated to position the body from the supine position to a right lateral recumbent position, and which also includes improvements that overcome the limitations of prior Islamic burial lahd solutions, is now met by a new, useful, and non-obvious invention.

In accordance with the purposes of the invention, as embodied and broadly described herein, the invention, in one aspect, relates to methods and apparatus for Islamic burial, such as, for example an improved Islamic burial lahd. In further aspects, the purpose of the present invention is to facilitate the proper burial rights prescribed by those of the Islamic faith, as well as to make it affordable and efficient. In another exemplary aspect, the invention relates to Islamic burial rites and rituals. In further aspects, the invention also relates to a burial device and apparatus for Islamic burial.

In one or more aspects, the present invention may provide for economical, safe and timely Islamically Sharia compliant burials.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to “claimed subject matter” refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION OF THE INVENTION

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Figure 1:
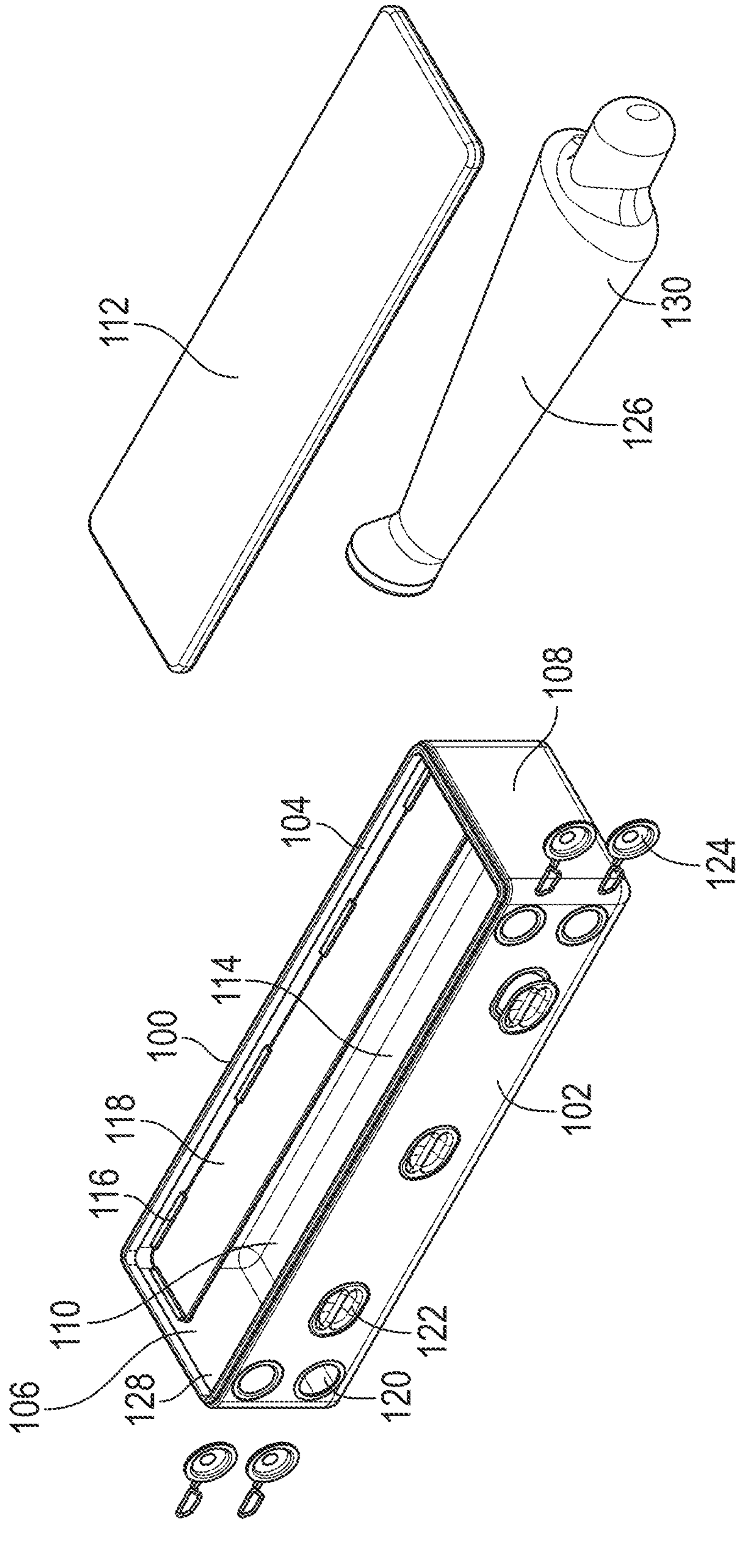
FIG. 1 shows a top perspective exploded view of an Islamic burial lahd, in accordance with an exemplary embodiment of the present invention.

FIG. 1 shows Islamic burial lahd 100 having first side wall 102 located opposite second side wall 104. First side wall 102 and second side wall 104 are parallel to each other. Third side wall 106 is located opposite fourth side wall 108. Third side wall 106 is parallel to fourth side wall 108. Fifth wall 110 is located opposite removable cover 112. First side wall 102, second side wall 104, third side wall 106, fourth side wall 108, and fifth wall 110 form chamber 114. Chamber 114 has inner wall surface 128. One or more retaining structures 116 are connected to inner wall surface 128 of chamber 114. In an example, retaining structure 116 may be connected to inner wall surface 128 of third side wall 106, second side wall 104, and fourth side wall 108. Chamber 114 is configured to receive body 126 of a deceased individual. Body 126 of a deceased individual is placed within chamber 114 of Islamic burial lahd 100 in supine position 130. First side wall 102 has at least one opening 120. At least one opening 120 may receive and retain handle 122 and/or tie down anchor 124.

Figure 2:
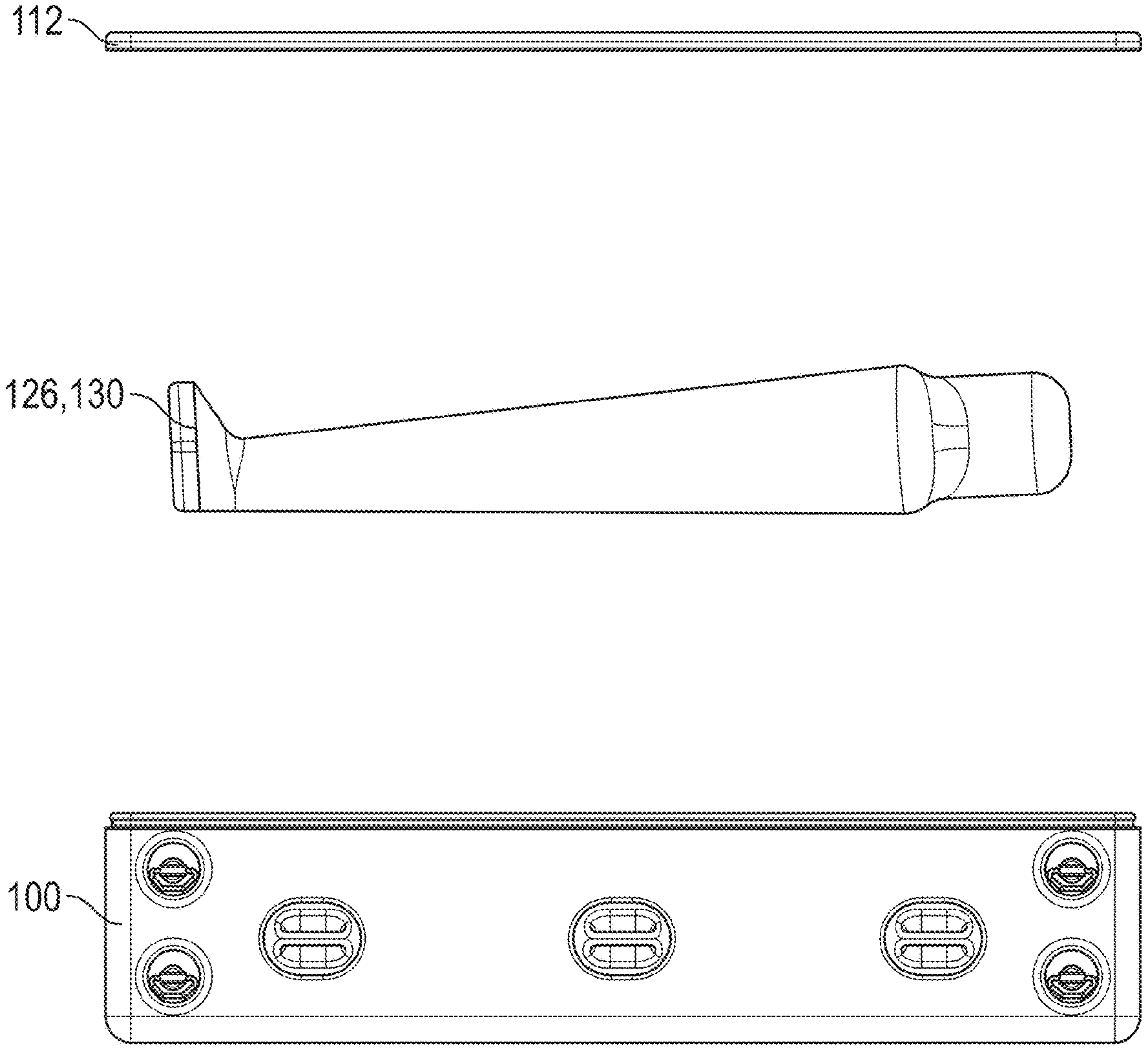
FIG. 2 shows a left side plan view of an Islamic burial lahd, in accordance with an exemplary embodiment of the present invention.
Figure 3:
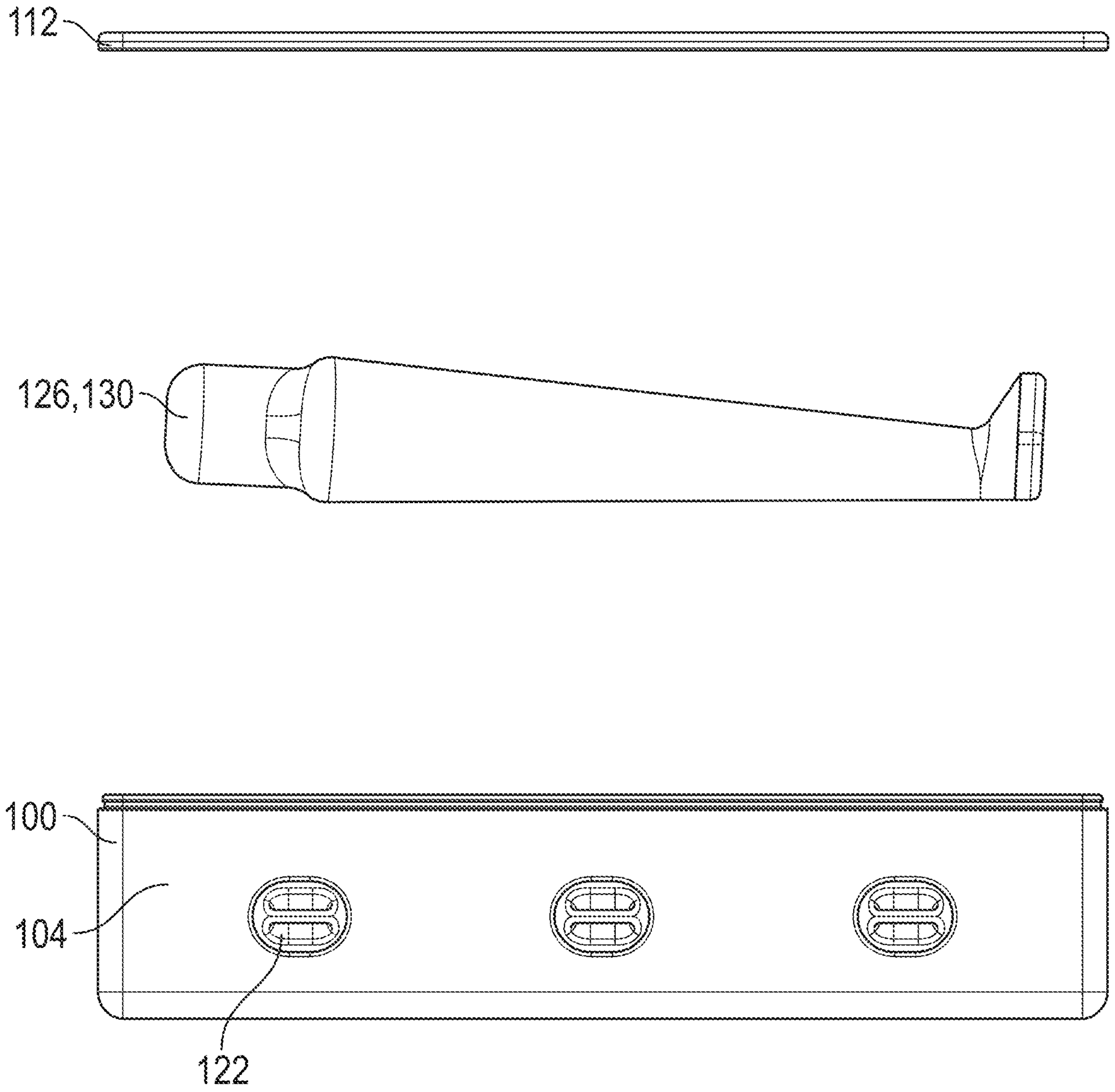
FIG. 3 shows a right side plan view of an Islamic burial lahd, in accordance with an exemplary embodiment of the present invention.

FIGS. 1-3 illustrate Islamic burial lahd 100 configured to receive body 126 of deceased individual in supine position 130. The supine position 130 requires the face and upper body to be turned upwards in a horizontal position towards removable cover 112. It is within the scope of this invention for removable cover 112 configured to have a self locking mechanism including, but not limited to, a clamp, an interlocking fit with the base casket lip, a lock, a fitted air tight sealed lid, a vacuum sealed lid, and/or any other type of locking and/or sealing mechanism. The ventral side of the body is up in a supine position, while the dorsal side is down in contact with fifth wall 110 (FIG. 1). FIG. 3 best shows Islamic burial lahd 100 having second side wall 104 having one or more handles 122.

Figure 4:
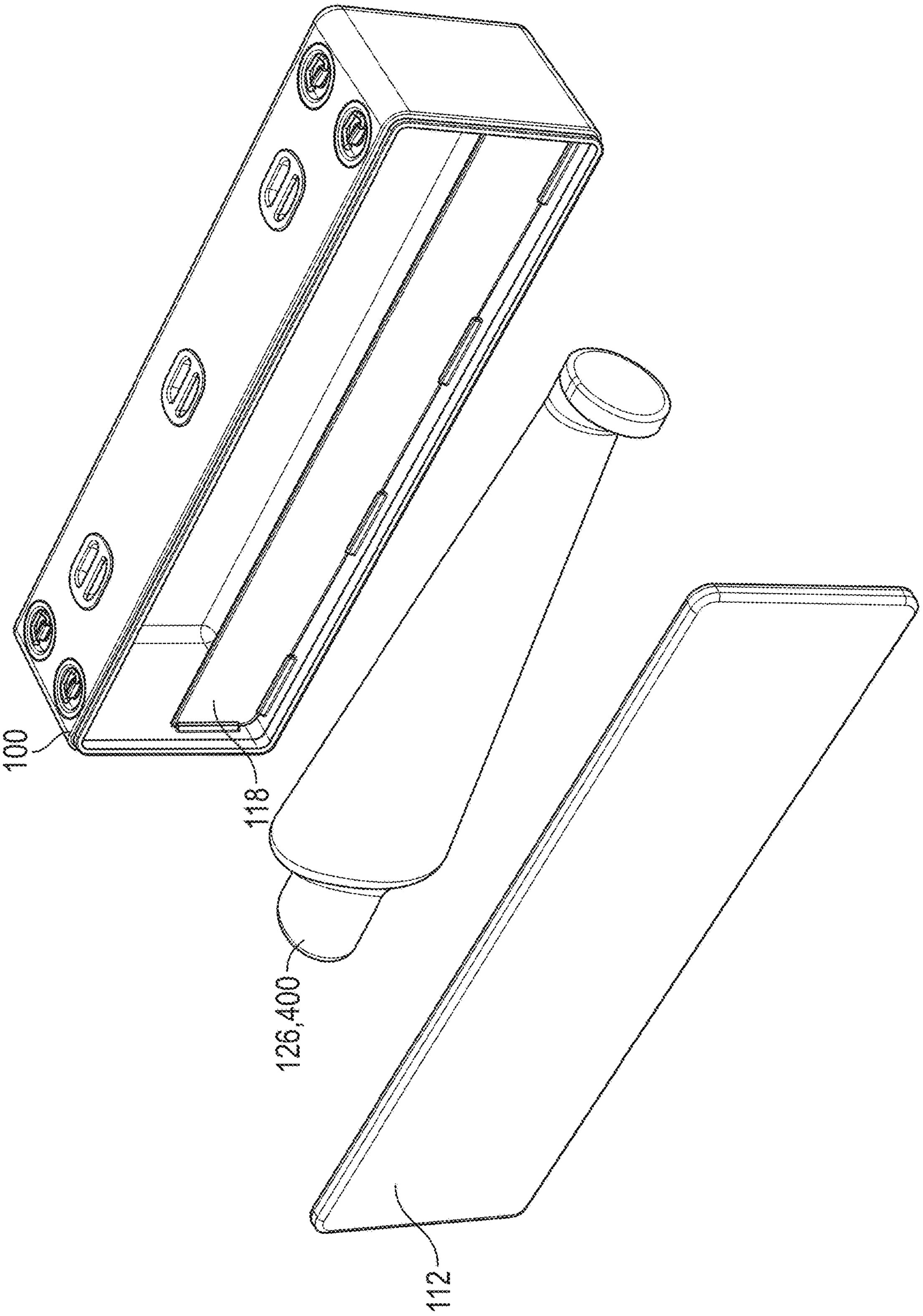
FIG. 4 shows an exploded view of an Islamic burial lahd configured to orient the body of a deceased individual in a right lateral recumbent position, in accordance with an exemplary embodiment of the present invention.
Figure 5:
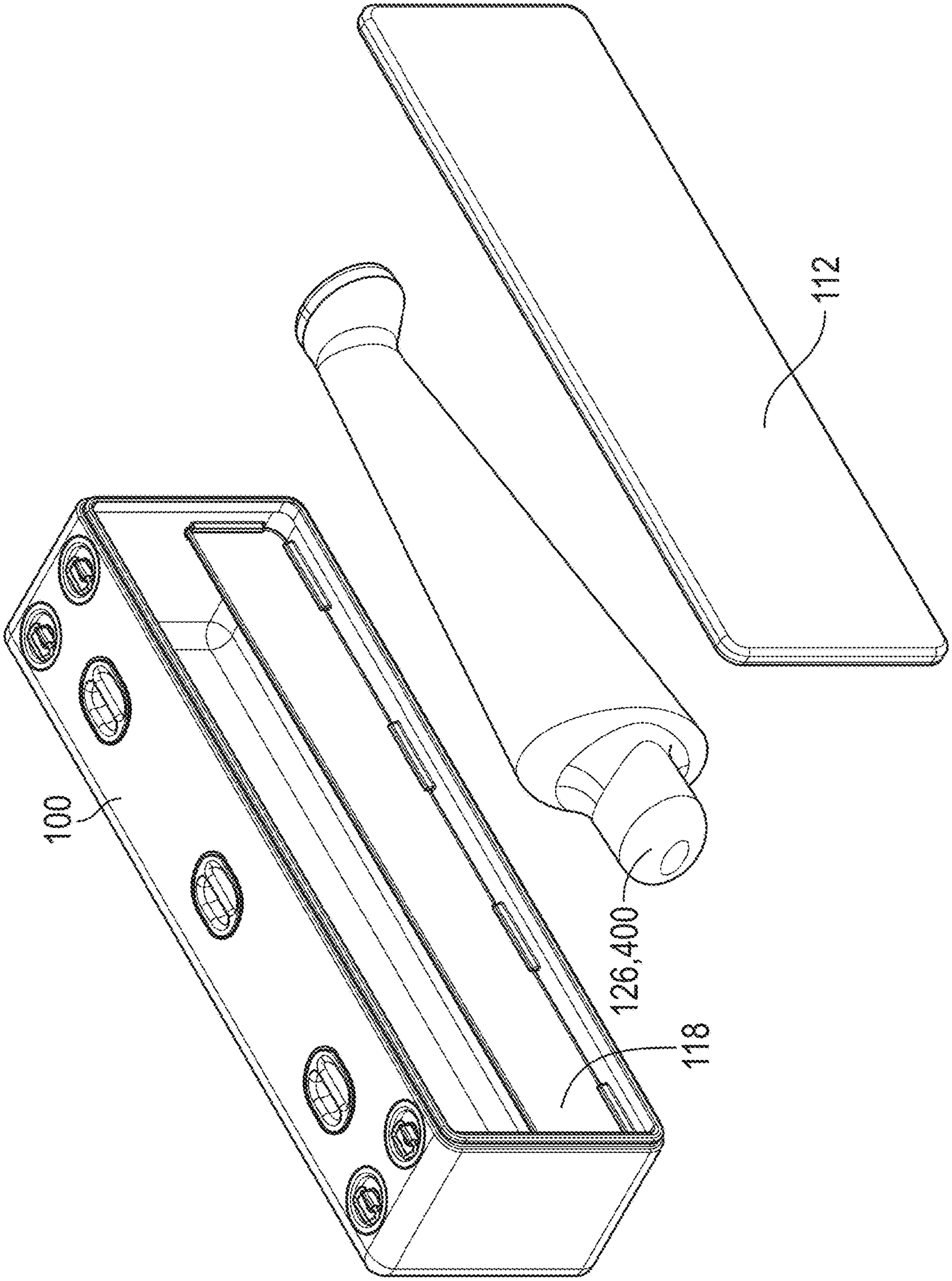
FIG. 5 shows an exploded view of an Islamic burial lahd configured to orient the body of a deceased individual in a right lateral recumbent position, in accordance with an exemplary embodiment of the present invention.

FIGS. 4-5 illustrate Islamic burial lahd 100 rotated substantially 90 degrees to orient body 126 of deceased individual retained within the chamber in a right lateral recumbent position 400. Right lateral recumbent position 400 refers to lying on one’s right side.

FIGS. 1, and 4-7 illustrate Islamic burial lahd 100 having removable plate 118. Removable plate 118 has an outer perimeter edge received by at least one of the one or more retaining structures 116 (FIG. 1). Removable plate 118 slidably traverses track 600 (FIG. 6) of retaining structure 116. Removable plate 118 overlays and presses firmly against ventral side of the body 126 of deceased individual when body 126 is placed within the chamber of the Islamic burial lahd 100 so as to maintain the positioning of body 126 when Islamic burial lahd 100 is rotated approximately 90 degrees to orient body 126 from supine position 130 to right lateral recumbent position 400.

Figure 6:
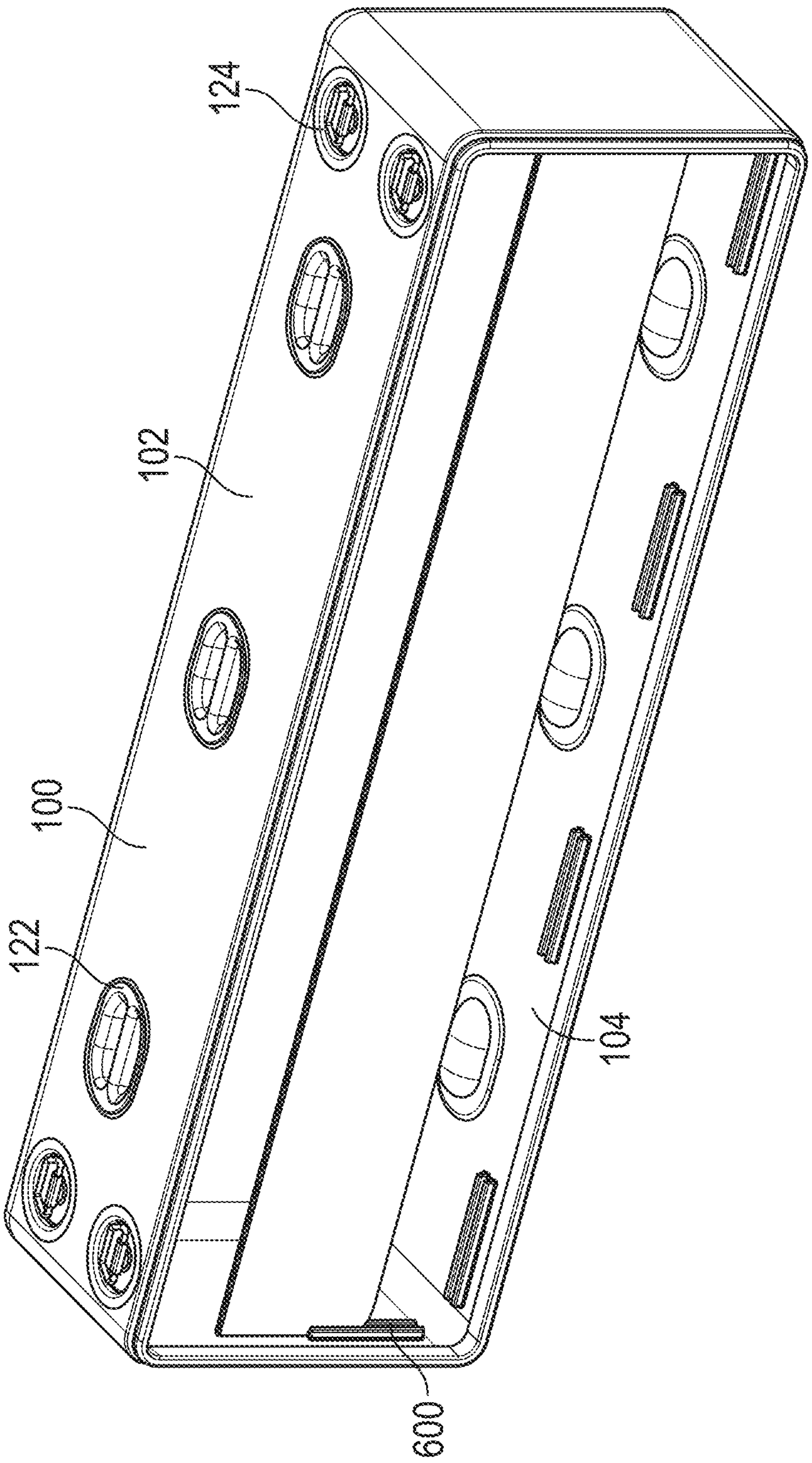
FIG. 6 shows a side perspective view of an Islamic burial lahd having a removable plate retained within and slidably traversing one or more retaining structures of the chamber, in accordance with an exemplary embodiment of the present invention.
Figure 7:
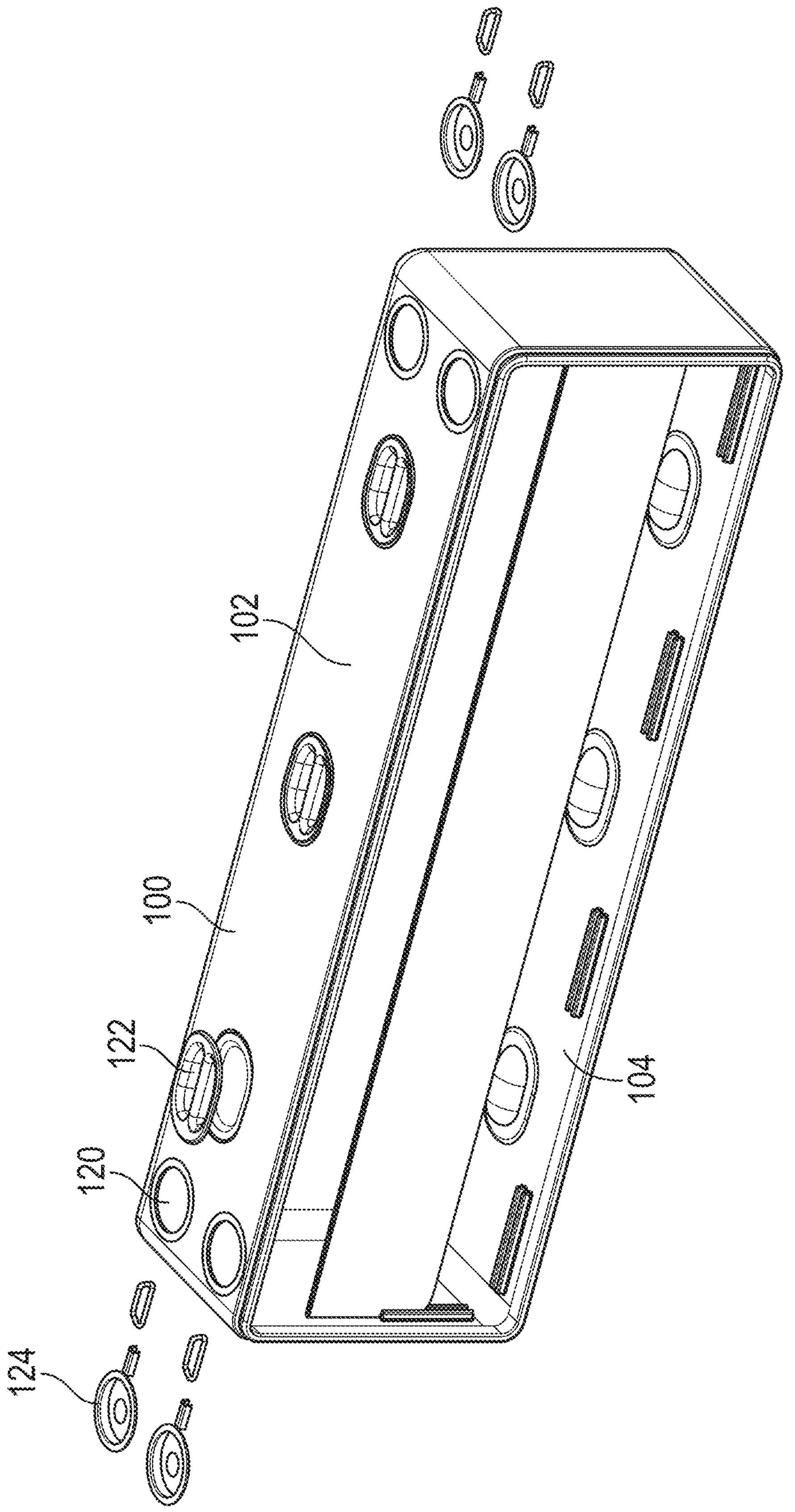
FIG. 7 shows a side exploded view of an Islamic burial lahd having one or more openings configured to retain a handle and/or a tie down anchor, in accordance with an exemplary embodiment of the present invention.

FIGS. 6-7 depict Islamic burial lahd 100 having first side wall 102 located opposite second side wall 104. First side wall 102 has at least one opening 120 (FIG. 7). At least one opening 120 (FIG. 7) may receive and retain handle 122 and/or tie down anchor 124.

Figure 8:
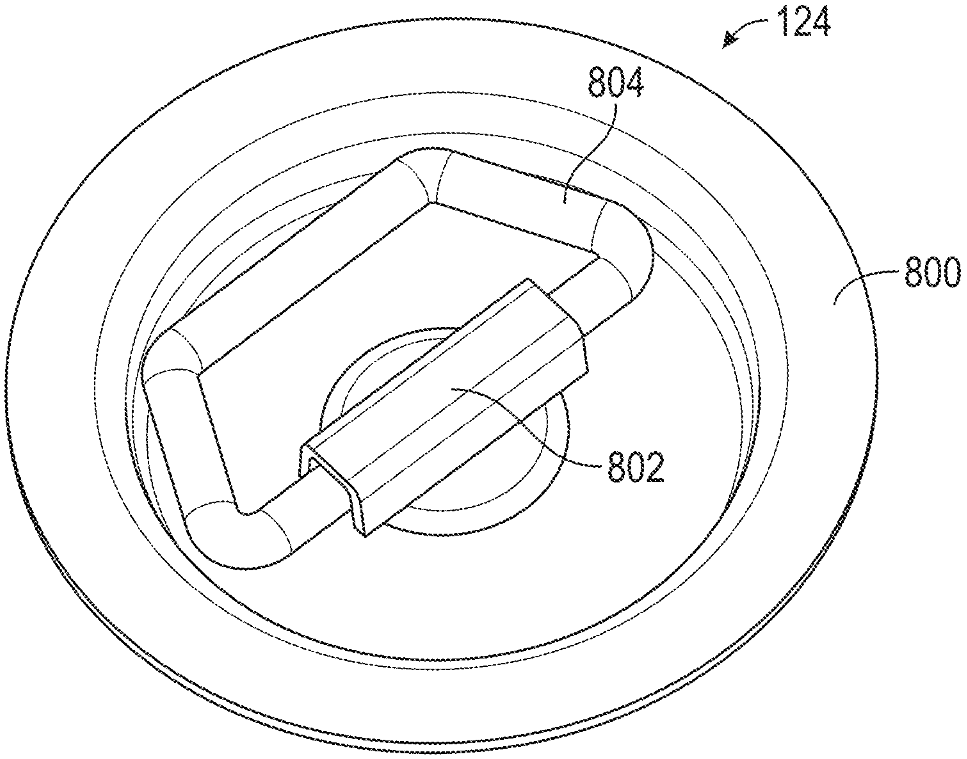
FIG. 8 shows a perspective view of the tie down anchor, in accordance with an exemplary embodiment of the present invention.
Figure 9:
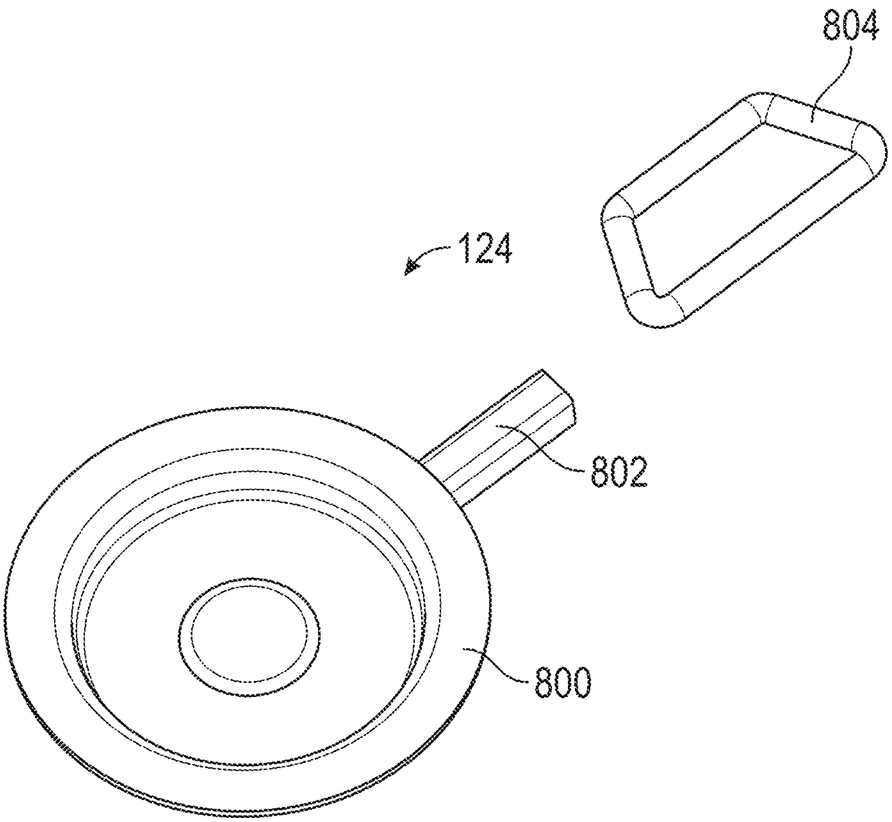
FIG. 9 shows an exploded view of the tie down anchor having a base plate, an anchor structure, and a ring, in accordance with an exemplary embodiment of the present invention.

FIGS. 8-9 illustrate tie down anchor 124 having base plate 800, anchor structure 802, and ring 804. Ring 804 is configured to receive length of material (not shown). A length of material includes, but is not limited to, a rope, a strap, a rod, a chain, a cable, a cord, and/or a band. At least a portion of the length of material is configured to be received by ring 804.

Figure 10:
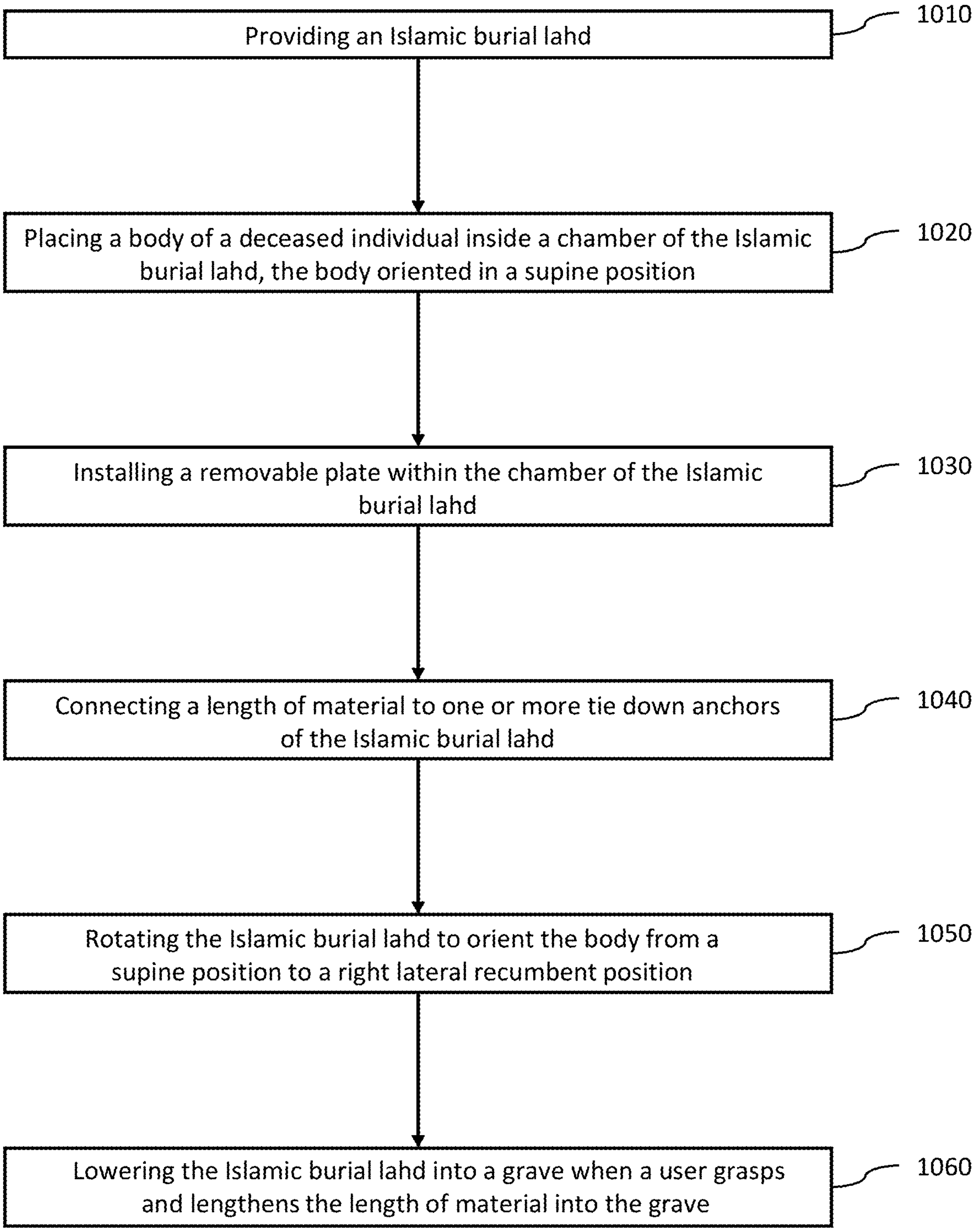
FIG. 10 shows a flowchart of an example method for Islamic burial, in accordance with an exemplary embodiment of the present invention.

FIG. 10 illustrates a flowchart of an example method for Islamic burial. At step 1010, providing an Islamic burial lahd. At step 1020, placing a body of a deceased individual inside a chamber of the Islamic burial lahd, the body oriented in a supine position. At step 1030, installing a removable plate within the chamber of the Islamic burial lahd. At step 1040 connecting a length of material to one or more tie down anchors of the Islamic burial lahd. At step 1050, rotating the Islamic burial lahd to orient the body from a supine position to a right lateral recumbent position. At step 1060, lowering the Islamic burial lahd into a grave when a user grasps and lengthens the length of material into the grave.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated by some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the invention as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Additional Description

As described above, the present disclosure relates, in various aspects, to method and apparatus for Islamic burial. In one aspect, the present disclosure provides an Islamic burial lahd. In further aspects, the present disclosure may provide an improved Islamic burial casket being made of any material including, but not limited to, commercial plastic and/or polyurethane, wood, and/or other material. Islamic Law (Sharia) requires the deceased to be washed in a ritual ablution. Afterwards, Islamic law requires the deceased to be wrapped and shrouded in a scented burial cloth (Kifaan). Further, Islamic law requires a ritual funeral prayer be recited over the deceased prior to interment. Upon interment, Islamic Law requires that the deceased be positioned on the right side facing Qiblah, the direction of prayer prescribed for Muslims. Depending on state regulations, the body of the deceased may be placed into either a concrete liner or directly into the grave. Traditionally, this duty requires the efforts of ten men. In most instances four to six individuals work together to lift and lower the deceased while two or three individuals descend into the grave to receive and appropriately position the body.

The present disclosure, according to further aspects, also provides methods of using the disclosed devices and systems. In one aspect, disclosed herein is a method for Islamic burial using the present invention.

In some aspects, the techniques described herein relate to an Islamic burial lahd, including: a first side wall located opposite a second side wall; a third side wall located opposite a fourth side wall; a fifth wall; the first side wall, the second side wall, the third side wall, the fourth side wall, and the fifth wall forming a chamber; the chamber having an inner wall surface; one or more retaining structures, the one or more retaining structures connected to the inner wall surface of the chamber; and a removable plate, the removable plate having an outer perimeter edge received by at least one of the one or more retaining structures.

In some aspects, the techniques described herein relate to a method of Islamic burial, including the steps of: providing an Islamic burial lahd; placing a body of a deceased individual inside a chamber of the Islamic burial lahd, the body oriented in a supine position; installing a removable plate within the chamber of the Islamic burial lahd; connecting a length of material to one or more tie down anchors of the Islamic burial lahd; rotating the Islamic burial lahd to orient the body from a supine position to a right lateral recumbent position; and lowering the Islamic burial lahd into a grave when a user grasps and lengthens the length of material into the grave. The removable plate within the chamber of the Islamic burial lahd is firmly pressed against the body of a deceased individual and is retained in place by one or more retaining structures so that the body does not slide around the chamber. It is within the scope of this invention for the Islamic burial lahd to be placed against the wall of a grave and/or a grave liner.

During the burial, an individual such as a pallbearer lowers the Islamic burial lahd into the grave by extension of the length of material, such as a strap. In this example, a pallbearer does not need to enter the grave during the process of placing the Islamic burial lahd into the grave. In an example, four removable lengths of material are retained by four tie down anchors. At least one pallbearer pulls on one or more lengths of material on the left or right portion of the Islamic burial lahd to position the body of a deceased individual on a chosen side to face Mecca. It is within the scope of this invention for the removable plate to act as a barrier for the body of the deceased individual to stay in a desired position and/or the chosen side. The removable plate may only cover at least a portion of a body when the body is retained within a chamber of the Islamic burial lahd. The removable cover may be placed over both the removable plate and the body of the deceased individual during transport of the body and/or during the burial to prevent contaminants such as dirt and/or soil from entering the chamber. This process eliminates the need for an individual having to remove a body from the Islamic burial lahd during positioning and eliminates the need for an individual to manually rotate the body from a supine position to the right lateral recumbent position after lowering the Islamic burial lahd into the grave.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entirety are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. An Islamic burial apparatus, comprising:

a head end wall located opposite a foot end wall;

opposing side walls configured such that a first side wall is located opposite a second side wall;

a bottom wall;

the head end wall, the foot end wall, the opposing side walls, and the bottom wall forming a chamber configured to receive a body of a deceased individual;

the chamber having an inner wall surface;

one or more retaining structures, the one or more retaining structures connected to the inner wall surface of the chamber;

a removable plate, the removable plate having an outer perimeter edge received by at least one of the one or more retaining structures;

wherein at least one of the one or more retaining structures comprises a track connected to the inner wall surface of the chamber;

wherein the removable plate is configured to slidably traverse the track of the at least one of the one or more retaining structures;

wherein the one or more retaining structures are attached to one of the opposing side walls and the head end wall and foot end wall;

wherein the removable plate is configured to be substantially the width of half the head end wall and the foot end wall and substantially the length of at least one of the opposing walls;

wherein the removable plate is configured to retain the body of the deceased individual within the chamber when the Islamic burial apparatus is rotated to position the body from a supine position to a right lateral recumbent position.

2. The Islamic burial apparatus of claim 1, wherein the first side wall has at least one opening.

3. The Islamic burial apparatus of claim 2, wherein the at least one opening is configured to receive and retain a handle.

4. The Islamic burial apparatus of claim 2, wherein the at least one opening is configured to receive and retain a tie down anchor.

5. The Islamic burial apparatus of claim 4, wherein the tie down anchor comprises:

a base plate;

an anchor structure; and a ring.

6. The Islamic burial apparatus of claim 5, wherein the ring is configured to receive a length of material.

7. The Islamic burial apparatus of claim 6, wherein the length of material comprises at least one of: a rope, a strap, a rod, a chain, a cable, a cord, or a band.

8. The Islamic burial apparatus of claim 1, further comprising a removable cover for closing the chamber.

9. The Islamic burial apparatus of claim 8, wherein the removable cover is configured to have a self-locking mechanism.

10. The Islamic burial apparatus of claim 9, wherein the self-locking mechanism comprises at least one of: a clamp, an interlocking fit, a lock, an air tight seal, or a vacuum seal.

11. The Islamic burial apparatus of claim 1, wherein the apparatus is configured to be rotated approximately 90 degrees to orient the body from the supine position to the right lateral recumbent position.

12. The Islamic burial apparatus of claim 1, wherein the apparatus is made of at least one of: plastic, polyurethane, or wood.

13. The Islamic burial apparatus of claim 1, wherein the apparatus is configured to be placed against a wall of a grave or a grave liner.

14. A method of Islamic burial, comprising the steps of:

providing an Islamic burial apparatus;

placing a body of a deceased individual inside a chamber of the Islamic burial apparatus, the body oriented in a supine position;

installing a removable plate within the chamber of the Islamic burial apparatus;

connecting a length of material to one or more tie down anchors of the Islamic burial apparatus;

rotating the Islamic burial apparatus to orient the body from the supine position to a right lateral recumbent position; and, lowering the Islamic burial apparatus into a grave when a user grasps and lengthens the length of material into the grave.

15. The method of claim 14, wherein the removable plate is firmly pressed against the body of the deceased individual and retained in place by one or more retaining structures to prevent the body from sliding within the chamber.

16. The method of claim 14, further comprising positioning the Islamic burial apparatus against a wall of the grave.

17. The method of claim 14, wherein lowering the Islamic burial apparatus into the grave is performed without the user entering the grave.

18. A method of Islamic burial, comprising:

providing an Islamic burial apparatus comprising:

a chamber formed by a plurality of walls;

one or more retaining structures connected to an inner surface of the chamber; and a removable plate receivable by at least one of the one or more retaining structures;

placing a body of a deceased individual inside the chamber in a supine position;

installing the removable plate in the one or more retaining structures within the chamber to secure the body;

connecting a length of material to one or more tie down anchors of the apparatus;

rotating the apparatus to orient the body from the supine position to a right lateral recumbent position; and lowering the apparatus into a grave by extending the length of material.

19. The method of claim 18, further comprising positioning the apparatus against a wall of the grave or a grave liner to orient the body to face a predetermined direction.

* * * * *